United States Patent [19]
Bonta

[11] Patent Number: 5,542,098
[45] Date of Patent: Jul. 30, 1996

[54] METHOD OF HANDOVER IN A CELLULAR SYSTEM

[75] Inventor: Jeffrey D. Bonta, Arlington Heights, Ill.

[73] Assignee: Motorola, Inc., Schaumburg, Ill.

[21] Appl. No.: 263,327

[22] Filed: Jun. 21, 1994

[51] Int. Cl.[6] ............................ H04B 7/26; H04Q 7/22
[52] U.S. Cl. .................... 455/33.2; 455/56.1; 379/60
[58] Field of Search ................... 455/33.1–33.4, 455/34.1, 34.2, 54.1, 54.2, 56.1, 62, 67.1; 379/59, 60

[56] References Cited

U.S. PATENT DOCUMENTS 5,175,867  12/1992  Wejke et al. ........................ 455/33.1
5,203,010  4/1993  Felix et al. ........................ 455/33.2

*Primary Examiner*—Chi H. Pham
*Attorney, Agent, or Firm*—Jeffrey G. Toler

[57] ABSTRACT

A method for handover in a cellular system is provided which includes periodically scanning from neighboring cells, traffic channels of a serving cell to determine channel metrics. If the channel metrics exceed a threshold, validating the serving cell identity by verifying traffic channel color code. The channel metrics are then periodically transferred to the serving cell where a handover decision is made.

16 Claims, 4 Drawing Sheets

METHOD OF HANDOVER IN A CELLULAR SYSTEM

FIELD OF THE INVENTION

The present invention relates generally to cellular communication systems, and more particularly to a handover method for analog microcell and macrocell systems.

BACKGROUND OF THE INVENTION

Cellular communication systems are known. As subscriber penetration continues to increase in analog cellular systems, so does the need for increased capacity. Cell splitting to reduce cell coverage while increasing reuse of radio channels will allow more subscribers to be served per unit area. When cells are reduced in size to the microcellular range (i.e. 100–500 meter cell radius), the ability to handover from one cell to another is complicated by the ability of the system to recognize the need to handover and to determine where to handover in a timely fashion (the term handover is also used to mean handoff as is understood in the art). In order to avoid unnecessary dropped calls due to the speed of the vehicle or the street corner effect, handover detection and execution needs to occur within 2–3 seconds. Current analog systems can require up to 8–10 seconds (or greater) to detect the need to handover, find a suitable target with strength measurement requests (HOMRs), and then execute the handover.

One method to counteract this problem was coined Cell Assisted Handover (CAHO), and a U.S. Pat. No. 5,203,010 issued April, 1993. The CAHO method is triggered when the source cell scan receiver detects that the uplink signal has fallen below a threshold. A HOMR is sent to neighbor cells along with the measured signal level and a forecasted signal level. The neighbor cell(s) then measure the mobile signal level and respond if acceptable. If not acceptable, then the neighbor cell will scan this mobile for a fixed window of time to see if the measured signal becomes acceptable with respect to the forecasted signal level. If it does, then the target cell will respond to the source indicating that it is now ready to accept the handover. Then, a final signal level measurement is performed by the source cell to make sure target signal level measurement is still better than source signal level measurement. While this method will tend to reduce the repetitions of HOMRs that don't initially succeed, it does not necessarily improve the overall reaction time to detect and execute a handover. A better method is still needed.

Another problem occurs when a mobile scans signaling channels in its idle mode scanning and locks onto a cell which is at a very great distance from the mobile. This can occur when the mobile is in an elevated position relative to the surrounding area causing line of site propagation with the remote site. When a call is established and the mobile moves from this elevated position, the call will typically drop because the neighbor cells cannot locate the mobile. If the mobile remains in the elevated position, then it can be a significant interferer to the reusers of that frequency.

DETAILED DESCRIPTION OF THE PREFERRED EMBODIMENT

Figure 1:
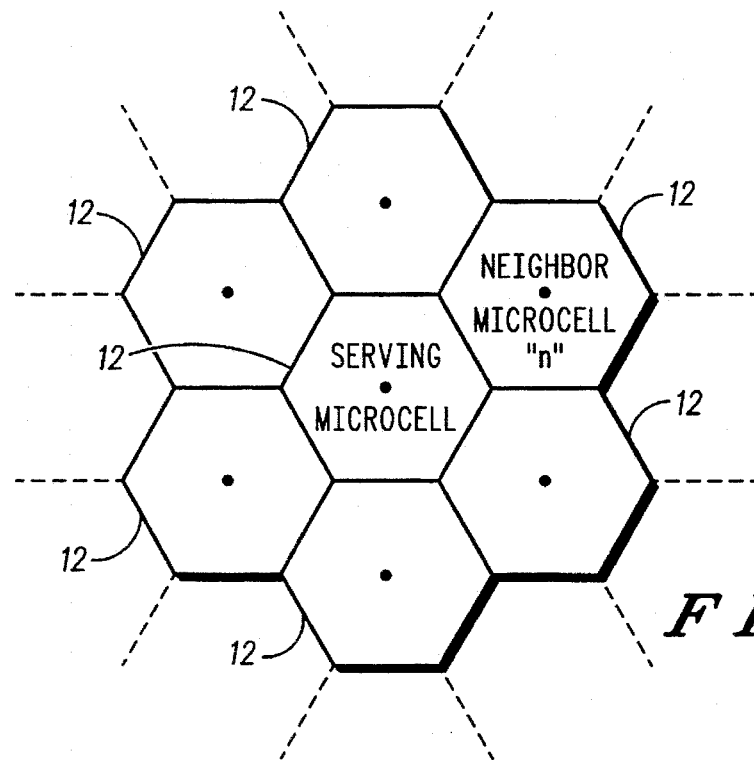
FIG. 1 generally depicts an idealized geographic layout of a cellular radiotelephone system.
Figure 2:
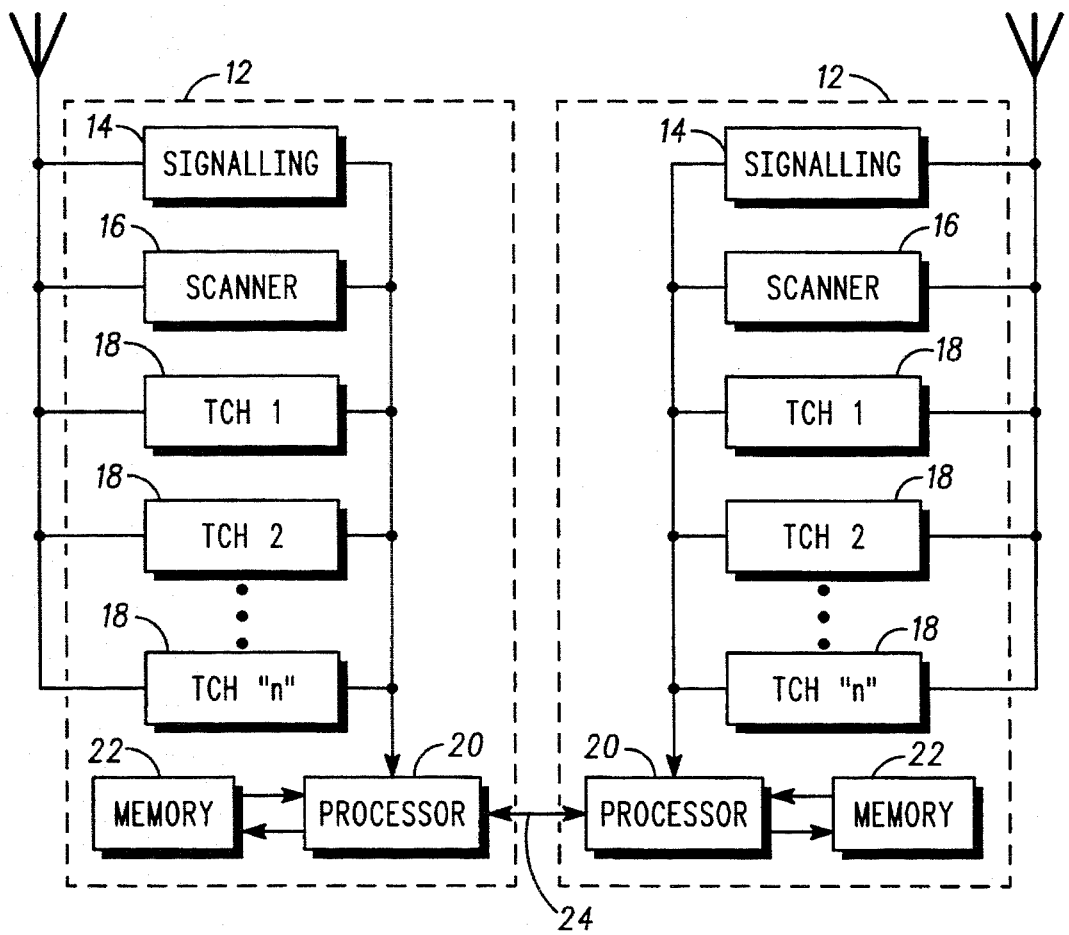
FIG. 2 is a block diagram of a serving microcell and a neighbor microcell in accordance with the present invention.

Shown in FIG. 1 is a microcellular system 10, with a plurality of microcells generally indicated as 12, secured for example, on light poles. Shown in FIG. 2, for example, is a serving microcell and a neighbor microcell with like reference numerals used to represent like elements. Each microcell 12 contains a signalling channel 14, scan receiver 16, and up to 10 traffic channels 18. Each microsite 12 further includes a processor and memory 22. In the preferred embodiment, each of the microcells 12 are linked by, for example, a communication link 24. It should be understood that any suitable signalling protocol may be used to link microcells 12. For example, each microcell 12 may be linked to the other microcells 12 by a communication link 24 supporting LAPD protocol. Upon activating microcellular system IFO, each microcell 12 is initialized with a list of traffic channel frequencies from neighbor microcells 12, the color code being used to identify each of these neighbor microcell traffic channel frequencies, as well as an address of the microcell which serves the traffic channel frequency and associated color code. The address is used, for example, for LAPD communications with the source microcells over at least one of the communication links 24. The information being communicated depends on the usage of traffic channels in neighbor microcells 12, and is described below.

Figure 3A:
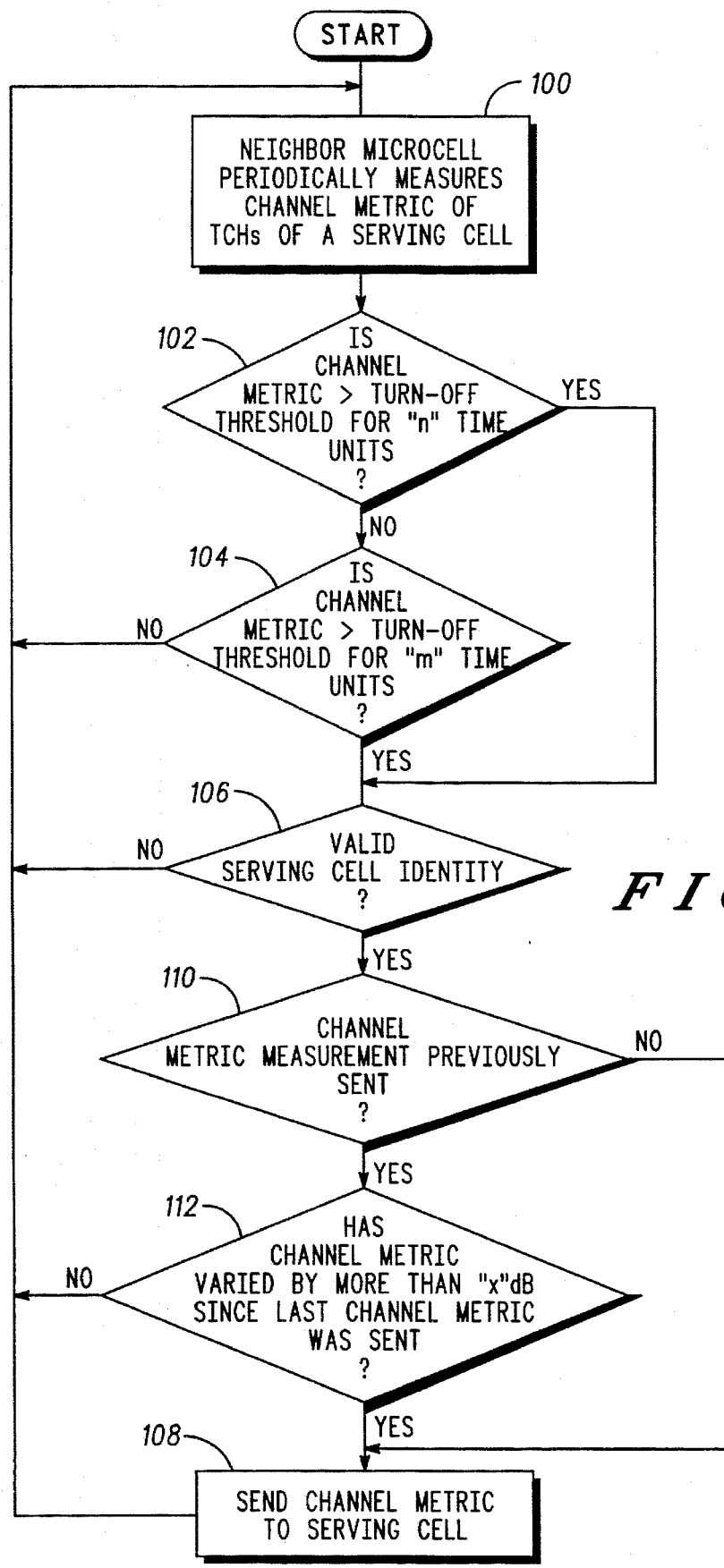
FIGS. 3A, 3B and 3C together illustrate the handover method according to a preferred embodiment of the present invention.
Figure 3B:
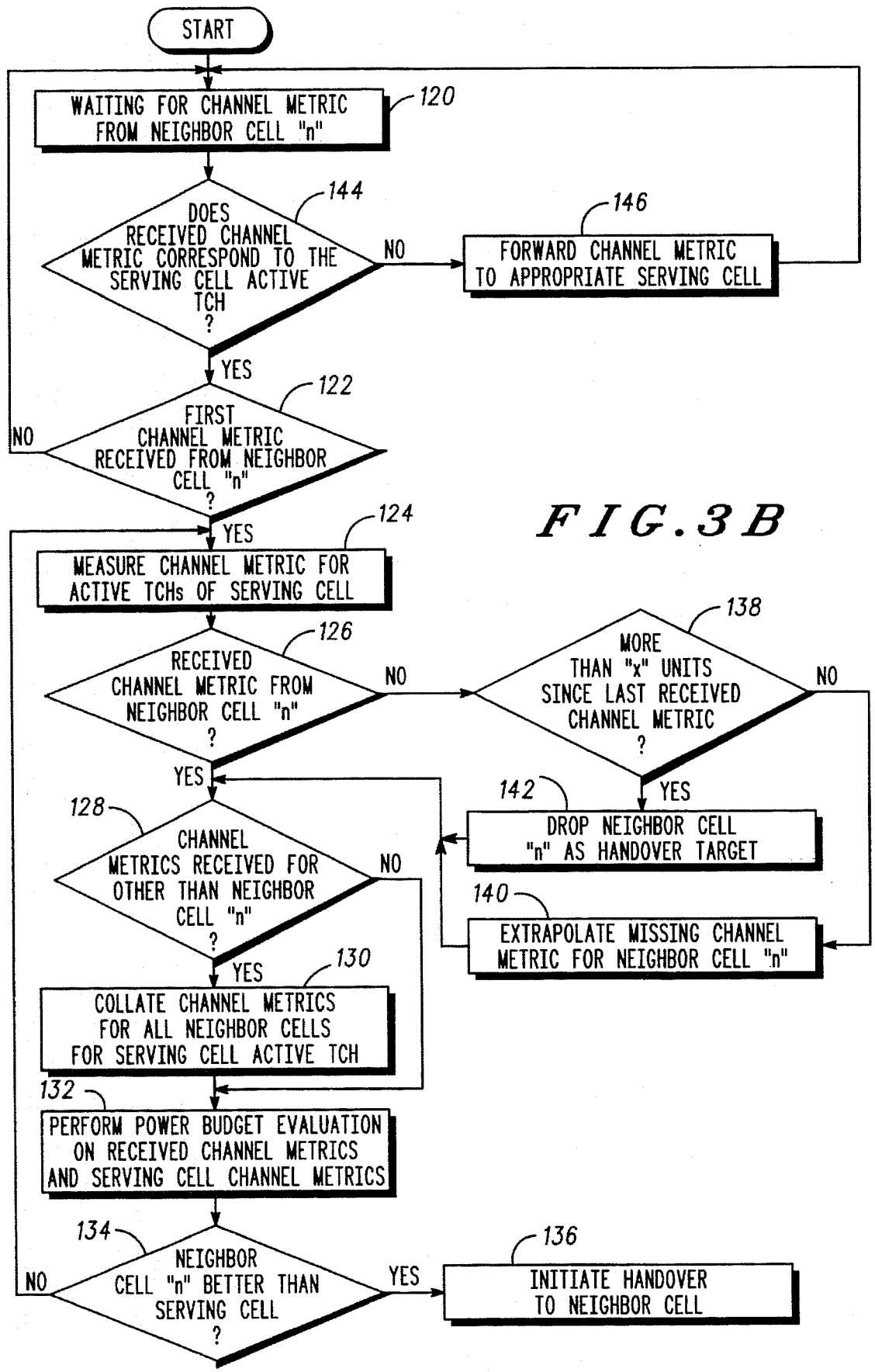
Figure 3C:
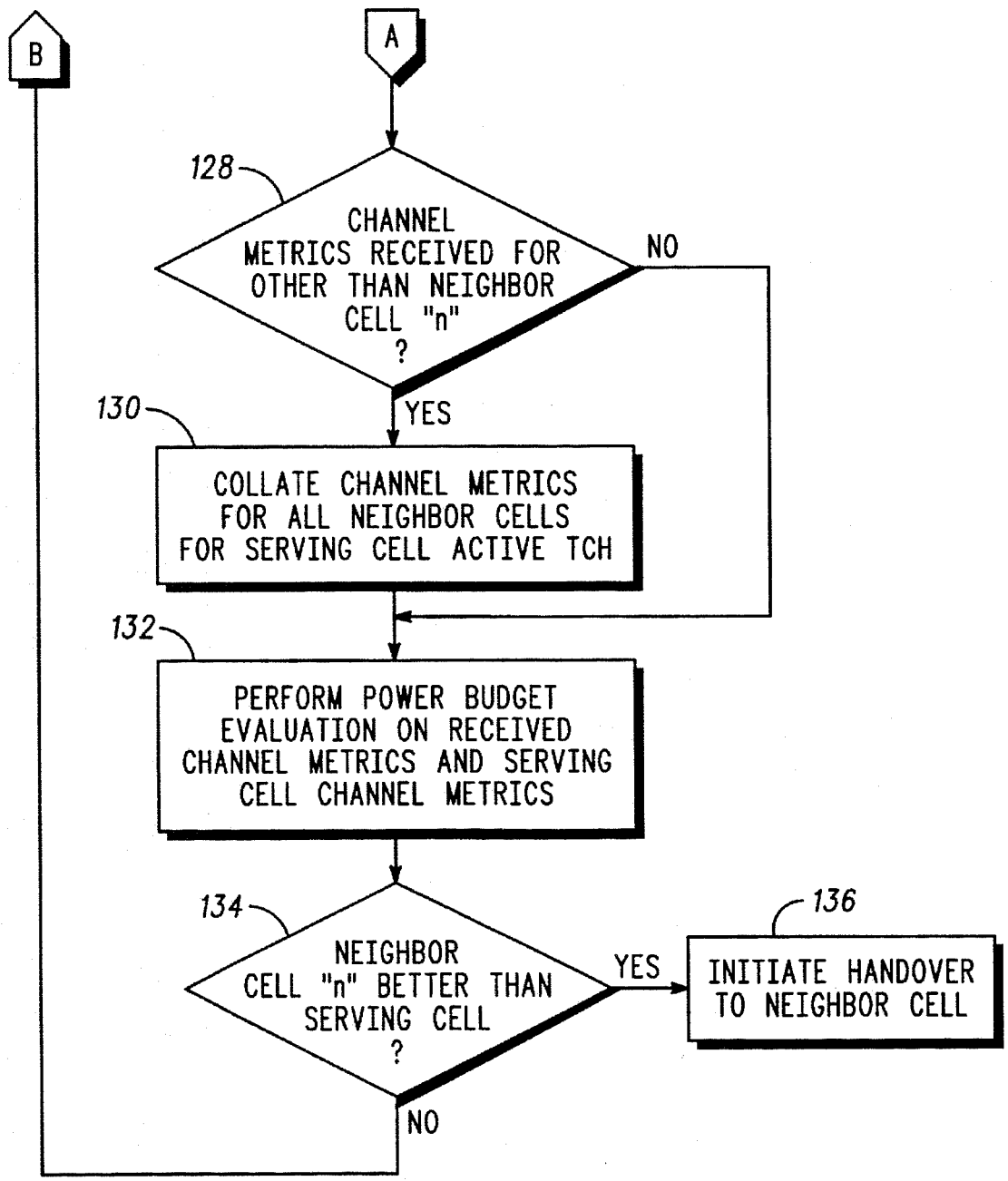

The following discussion is in terms of an analog cellular system, however, one of ordinary skill in the art would understand that it is equally applicable to time slots such as in TDMA systems or coded signals such as in CDMA systems. Unlike traditional analog systems, the nonserving microcell (neighbor) scan receiver does not receive HOMRs (requests for signal strength measurements) from the serving microcell. Instead, and with reference to FIGS. 3A and 3B the neighbor scan receivers are initialized to continuously monitor a channel metric of a list of traffic channels equipped in the serving microcell at a periodic rate (e.g. once per second) regardless of whether or not they are in-use 100. When a traffic channel is used in a serving microcell, the neighbor scan receiver begins to measure significant change in the channel metric. When the channel metric rises above a set threshold 102 and 104, the neighbor scan receiver verifies that the color code matches the frequency being measured 106, and if it does, the neighbor microcell begins to transfer measurements (at the periodic measurement rate) to the serving microcell 108. It should be understood that suitable channel metrics include received signal strength (RSSI), carrier to interference plus noise, and the like.

The serving microcell normally expects to receive channel metric measurements related to active traffic channels 120. Upon receiving the first channel metric from neighbor microcell n 122, the serving microcell will enter a mode where it expects to periodically receive channel metrics from neighbor microcell n. The serving microcell will measure the channel metrics for its active traffic channels 124. The serving microcell will then receive channel metrics from one or more neighbor microcells 126, 128 regarding their uplink channel metrics of the mobile that it is serving. This information will be collated into periodic channel metric records 130 which can be used to make power budget decisions 132 (or emergency decisions where the serving microcell traffic channel quality has fallen below unacceptable levels) in the same fashion as TDMA systems do today, e.g. GSM Recommendation 5.08. The serving microcell then determines if neighbor cell n has better traffic channel quality 134 and initiates a handover to neighbor cell n if it does 136. Additional information may also be passed to aid in the handover decision. This additional information may come from the candidate target, or it may come from stripped down microcells that only have scan receivers. In the latter case, the additional measurement information could be used to help locate the position of the mobile through inferencing.

In the event that an expected periodic channel metric is not received 138, the serving microcell will extrapolate for a time X the missing channel metric 140 based upon previously received channel metrics for that traffic channel. If time X expires without receiving further expected periodic channel metrics from neighbor microcell n, neighbor microcell n is dropped from consideration as a handover target 142.

The neighbor microcells will continue to periodically report channel metrics to the serving microcell until its scan receiver measures the frequency below some set threshold. The color code verification need not be performed at each measurement interval, but will need to be verified periodically. This will help in increasing the accuracy of the channel metrics and will increase the capacity of the scan receiver.

It is possible that a channel metrics is delivered to a microcell which is not actually serving a mobile on that frequency 144 (i.e. as determined by the frequency and color code reuse). Each microcell could be initialized with additional addressing information of neighbor microcells that are reusing this frequency and color code. The measuring neighbor microcell could then route the channel metric information to the proper serving microcell 146 once it is informed of the error. This capability would actually be very useful in solving a typical problem in analog systems where mobiles lock onto signalling channels at very large distances from their present location, and the establish a call with the remote site. If the serving microcell could be made aware of the situation, then the mobile could potentially be handed off to a measuring neighbor microcell to avoid a possible drop or interference problem.

With reference once again to FIG. 3A, an alternate embodiment introduces multiple thresholds. The first threshold called a "turn-off" threshold is used to trigger the discontinuation of the sending of channel metrics for a serving microcell traffic channel 102. The second threshold called a "turn-on" threshold is used to begin transmission of channel metrics for a serving microcell traffic channel 104. Further the turn-off threshold is used to initiate transmission of channel metrics for serving microcell traffic channel if the channel metric exceeds the turn-off threshold for a period of N time units, e.g. 4 seconds. Similarly, the turn-on threshold is used to initiate transmission of channel metrics for serving microcell traffic channels if the channel metric exceeds the turn-on threshold for a period of M time units, e.g. 2 seconds. One skilled in the art will recognize that additional thresholds could be used to further control the transmission of channel metrics to a serving microcell.

To further relieve transmission burden, the neighbor microcell determines if a channel metric has previously been sent 110. If it has, it further determines if the present channel metric varies from the previously sent channel metric by more than X dB, e.g. 3 dB 112.

The scan receiver in the serving microcell is still used to monitor the traffic channel it serves. These channel metrics are necessary for uplink power control as well as in the power budget and emergency handover decisions.

The present invention has been described for exemplary purposes in terms of several preferred embodiments. It should be understood, however, that persons of ordinary skill in the art may otherwise embody its broad teachings without departing from the fair scope as defined in the subjoined claims.

I claim:

1. A method for handover in a cellular system comprising the steps of:

(a) periodically scanning at a neighboring cell, traffic channels of a serving cell to determine for each traffic channel a channel metric;

(b) for each channel metric exceeding a threshold, validating the serving cell identity;

(c) periodically transferring from the neighboring cell to the serving cell channel metrics which exceed the threshold for each traffic channel; and (d) selecting a new serving cell based on the transferred channel metrics.

2. The method as in claim 1 wherein the threshold comprises a first and at least a second threshold.

3. The method as in claim 2 further comprising the step of determining if the channel metric exceeds the first threshold for more than N time units.

4. The method as in claim 2 further comprising the step of determining if the channel metric exceeds the at least second threshold for more than M time units.

5. The method as in claim 1 wherein the channel metric comprises received signal strength.

6. The method as in claim 1 wherein the channel metric comprises carrier to interference plus noise.

7. The method as in claim 1 wherein the step of periodically transferring channel metrics further comprises:

sending the channel metric to the serving cell if the channel metric has varied by more than a predetermined amount.

8. The method as in claim 1 further comprising the step of determining a channel metric for an active traffic channel of the serving cell.

9. The method as in claim 1 wherein the step of periodically transferring the channel metric further comprises extrapolating a channel metric if the channel metric has not been transferred to the serving cell within X time units since transferring a preceding channel metric.

10. The method as in claim 1 wherein the step of selecting a serving cell further comprises performing a power budget evaluation.

11. The method as in claim 1 further comprising the step of determining if a received channel metric corresponds to an active traffic channel of the serving cell and routing the received channel metric to an appropriate serving microcell if the received channel metric does not correspond to an active traffic channel of the serving cell.

12. A method for handover in a cellular system comprising the steps of:

(a) periodically scanning at a plurality of neighboring cells, traffic channels of a serving cell to, for each traffic channel, determine a channel metric;

(b) for each channel metric exceeding a threshold, validating the serving cell identity;

(c) periodically transferring from the neighboring cell to the serving cell, the channel metrics which exceed the threshold; and (d) selecting a new serving cell based on the transferred channel metrics.

13. The method as in claim 12 further comprising the step of collating the channel metrics at the serving cell.

14. The method as in claim 12 wherein the step of selecting a serving cell further comprises performing a power budget evaluation.

15. The method as in claim 12 further comprising the steps of determining if a received channel metric corresponds to an active traffic channel of the serving cell and routing the received channel metric to an appropriate serving microcell if the received channel metric does not correspond to an active traffic channel of the serving cell.

16. A method for handover in a cellular system comprising the steps of:

(a) periodically scanning at a plurality of neighboring cells, traffic channels of a serving cell to, for each traffic channel, determine a channel metric;

(b) for each channel metric, determining if the channel metric exceeds at least one threshold;

(c) validating serving cell identity when the channel metric exceeds the at least one threshold;

(d) determining if the channel metric varies by more than a predetermined amount from a previously sent channel metric;

(e) periodically transferring from the neighboring cell to the serving cell the channel metrics which exceed the at least one threshold for each traffic channel;

(f) determining an active traffic channel of the serving cell;

(g) performing a power budget evaluation; and (h) selecting a new serving cell based on the channel metrics.

* * * * *